Dec. 22, 1964
R. E. HURST
3,162,037
METHOD OF MEASURING PERMEABILITY OF FRACTURED
SUBTERRANEAN FORMATIONS
Filed Dec. 19, 1960
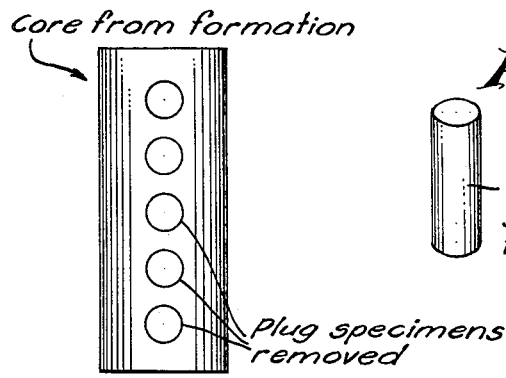
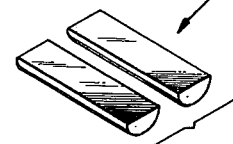
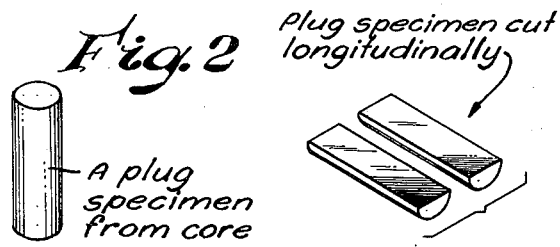
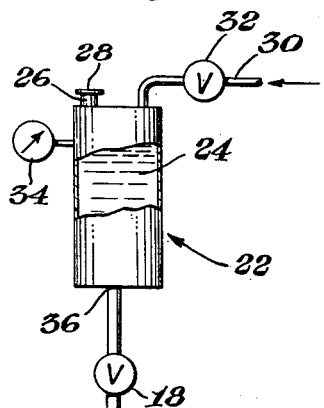
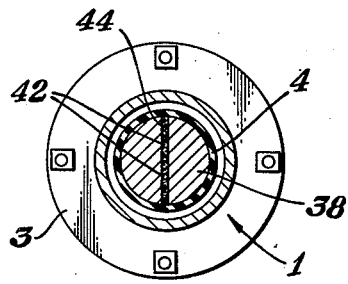
INVENTOR.
Robert E. Hurst
BY
C.W. Carlin
ATTORNEY

United States Patent Office 3,162,037
Patented Dec. 22, 1964

3,162,037
METHOD OF MEASURING PERMEABILITY OF FRACTURED SUBTERRANEAN FORMATIONS
Robert E. Hurst, Midland, Mich., assignor to The Dow Chemical Company, Midland, Mich., a corporation of Delaware
Filed Dec. 19, 1960, Ser. No. 76,793
4 Claims. (Cl. 73—38)

The invention pertains to well treatment and more particularly to a method of testing a subterranean formation penetrated by a well prior to the treatment of the formation.

Treatment of a well refers to contacting at least a portion of a formation traversed by a well with a composition, instrument or the like, for the broad purpose of altering the well or formation, to some extent, to attain a specific end, e.g., to improve production of a fluid contained in the formation.

A treatment of a well usually requires rather extensive employment of equipment and personnel, and consumption of chemical compositions, all of which entails considerable expenditure. Selection of the proper or best suited treatment, therefore, is of far-reaching economic concern in the business of producing fluids from the earth.

It is, accordingly, clearly significant in the art of treating a well to ascertain as nearly as possible, prior to the treatment thereof, the nature of the formation to be treated and the method of treatment and the composition of the treating agents which are most likely to effect the ends sought to be gained by the treatment.

The need for this knowledge has long been recognized and attempts have been made to learn something of the nature of the formation penetrated by a well to be treated, prior to treatment. Such attempts have usually comprised obtaining a core from the formation to be treated and examining it without modification to ascertain its porosity, permeability, and the most likely effects on the formation of the treating composition to be employed. Standard tests employing an especially designed apparatus are commonly used in attempts to acquire information about the formation to be treated.

Such attempts have been somewhat rewarding when a composition was injected into a well for the purpose of merely bringing it into contact with some of the more exposed faces of the formation. Illustrative of attempts which have resulted in some useful knowledge of a formation are those performed preparatory to acidizing. Acidizing comprises injecting an aqueous acid down a well, penetrating a carbonate-containing formation or other acid soluble formation, for the purpose of reacting the acid with acid soluble material to open up channels and passageways therein.

However, a very large number of well treatments which are now carried out entail hydraulic fracturing of a formation. The term fracturing, as used herein, refers to the creation of cracks, breaks, fissures, and the like in a subterranean formation as a result of forcing liquid down a well and against exposed formation penetrated by it at sufficient pressure to attain this end. A particulate material, e.g., sand of suitable mesh size, is often suspended in a treating fluid and injected therewith into the cracks or fissures in the formation after they have been created to prop them open so as to lessen the tendency for them to close up following a fracturing operation.

At present, treatment of a formation entailing fracturing or treatment of a fluid-bearing formation is carried out without adequate pre-examination of either the formation or a specimen thereof to ascertain the receptivity or susceptibility of the formation to improvement through fracturing or to ascertain the suitability of the method and materials contemplated for use during the fracturing operation or for subsequent treatment of a specific formation. Examination of a core without modification or special treatment of the core, after it has been taken from a formation prior to use, to learn its specific characteristics in relation to fracturing or treatment of a fractured formation, is not fully satisfactory for testing the formation to ascertain the best fracturing technique and to ascertain the extent to which a fractured formation is susceptible to improvement by a treating fluid.

In view of the large number of types of fluid-producing formations and the large number of methods and treating compositions now in use for fracturing and subsequent treatment of such formations, there is a need for a method of testing a formation prior to fracturing and subsequent treatment for the purpose of ascertaining the proper technique and material to employ in the fracturing treatments and operations. It is, accordingly, the principal object of the invention to provide a method of testing a formation preparatory to fracturing and subsequent treatment thereof, whereby a representative specimen of the formation is treated under controlled and observed conditions and the efficiency of proposed fracturing and treating methods and compositions may be evaluated prior to fracturing the formation itself.

How this and related objects are attained is set forth in the ensuing description and is specifically defined in the appendant claims.

The invention is a method of testing a formation penetrated by a well preparatory to fracturing the formation to gain useful information of the nature of the formation, the likelihood of its being improved by fracturing and follow-up treatment of the fractured formation and the best suited method and composition to be used in the fracturing operation or subsequent treatment which comprises: obtaining a core from the borehole of the well at the level at which treatment is to be carried out, such core usually being transverse to the bedding planes of the strata comprising the formation; cutting at least one plug from the core at right angles to the axis of the core, i.e., along the bedding planes of the strata composing the formation thus sampled; cutting the plug thus obtained longitudinally to provide mating or complementary faces and placing the faces of the thus cut plug in opposing relationship in a position resembling the plug prior to its being cut but now having a scission to simulate a fracture; placing the thus assembled plug in a confining vessel equipped with a cylindrical flexible sleeve which forms a seal about the cylindrical periphery thereof but allows the ends thereof to remain open for ingress and egress of a fluid; applying pressure against the side wall of the flexible sleeve and thus against the circumferential periphery of the thus assembled plug to simulate the pressure of overburden in the subterranean formation; and measuring the permeability of the scissioned specimen thus assembled and set up in the apparatus. The ease or difficulty with which a fluid passes through the specimen while it is subjected to varying pressures against the cylindrical wall to simulate overburden is a measure of the susceptibility of the formation to being improved by employing the composition and technique being tested. It is recommended that some spacing be maintained along the scission between the faces of the plug, as by inserting a wire therein and packing the space with a propping agent such as sand; the wire is removed before proceeding with the test and additional propping agent, if desired, then packed into the space.

The extent of improved flow, if any, of the testing fluid through the specimen is a measure of the efficiency of the method and composition employed in treating the specific formation.

FIGURE 1 illustrates a 4-inch diameter core taken from a borehole, substantially transverse to the bedding planes of the formation penetrated thereby, from which a number of 1-inch diameter plugs have been cut parallel to the bedding planes and removed for testing purposes.

FIGURE 2 shows one of the plugs thus removed.

FIGURE 3 shows the mating faces of two halves of the plug of FIGURE 2 after it had been cut longitudinally by means of a power-operated diamond blade saw to simulate a fracture.

FIGURE 4 is a schematic view, partly in section, of the prominent features of a simple form of apparatus useful for testing the assembled plug in accordance with the practice of the invention.

FIGURE 5 is a sectional view at line 5 of FIGURE 4 showing the mating faces of the two halves of the plug, held spaced-apart and having propping sand in the simulated fracture.

The apparatus of FIGURE 4 is provided with a cylindrical steel testing chamber 1 which may be dismantled and reassembled by means of bolted flange assemblies 2 and 3, and comprises a cylindrical rubber or plastic sleeve 4, open at each end, of similar shape but of slightly less dimensions, inserted into the steel chamber; opening 6 in the circumferential wall of the chamber leading into the interior thereof, pipe 7 connected to a source of fluid under pressure (not shown), and leading to said opening for the purpose of admitting a fluid to exert force against the wall of sleeve 4 to simulate overburden, valve 8 in said pipe for controlling the pressure against the sleeve as desired, and gauge 9 for measuring said simulated overburden pressure; openings 11 and 12 in the lower and upper ends of said steel chamber to which are connected inlet and outlet pipes 14 and 16, respectively, provided with valves 18 and 20, respectively, for admitting and emitting a treating liquid. To provide treating fluid under pressure, there is shown reservoir 22, containing treating fluid 24, provided with opening 26 in the top thereof for admission of treating fluid thereinto as desired and equipped with tightly sealing removable cap 28; gas inlet line 30 provided with valve 32 for the admission of gas for pressurizing the treating fluid and gauge 34 for measuring the pressure on the treating fluid in the reservoir; and outlet 36 to permit treating fluid to flow into pipe 14 leading from the reservoir into lower opening 11 of the steel chamber. Receptacle 37 is positioned at the outlet of pipe 16 to receive overflow treating fluid from testing chamber 1.

An apparatus of the general type shown in FIGURE 4 is defined in the American Petroleum Institute publication entitled "Recommended Practices, Standard Procedure for Testing Fracturing Fluids," commonly referred to briefly API RP 39, published in July 1960 at pages 10 to 14.

Plug 38, serving as the test specimen and containing simulated fracture 40, is shown positioned in sleeve 4 in accordance with the practice of the invention.

In carrying out the invention employing the apparatus as illustrated, the plug is assembled by placing the two halves thereof together, to approximate their relative positions before the plug was cut, and positioned, thus assembled, in the flexible sleeve. The halves thus positioned are usually maintained about ⅛ inch apart. Such ⅛ inch spacing is easily formed and maintained during the emplacement of the plug in the cylindrical chamber by inserting a ⅛ inch diameter wire, designated item 42 in FIGURE 5 shown as in a U-shaped loop with the open end of the U constituting the leading portion of the loop, into the simulated fracture to provide easy removal of the loop. The ⅛ inch space thus formed is shown at least partially packed with a propping agent designated item 44 in FIGURE 5. The propping agent commonly used is a 20 to 60 mesh size sand (United States Bureau of Standards Series). After a substantial portion of the propping agent has been placed in the fracture, the wire is withdrawn and additional propping agent, necessary for completely filling the fracture, is packed therein.

Treating fluids, among which may be included fracturing fluids, are then forced, at a specified pressure, e.g., 50 p.s.i.g., (p.s.i.g. means pounds per square inch gauge reading) into the lower end of the thus assembled plug positioned in the flexible sleeve and caused to flow through the plug and out the upper end thereof, while a pressurizing fluid is caused to exert pressure against the flexible sleeve, which pressure is transmitted to plug 38 therein, to simulate overburden. The pressure exerted by the fluid to simulate overburden is usually varried from 1000 or 2000 p.s.i.g. to 8000 or 10,000 p.s.i.g.

The following examples are illustrative of the invention:

Cores, about 4 inches in diameter and between 8 and 16 inches long were obtained from wellbores, being cut substantially transverse to the bedding planes traversed by the wellbores, at a depth of between 8160 and 8188.5 feet. Ten 1-inch diameter, 1-inch long cylindrical plug specimens were cut from the cores, parallel to the bedding planes, i.e., at right angles to the axis of the cores. All of the plugs, as nearly as could be observed, were substantially of the same geologic structure and character. Each of the plug specimens, without further change, was subjected to a preliminary test at 50 p.s.i.g. and a 1000 pounds overburden and each was found to have a permeability of substantially zero at these rather favorable conditions for the penetration of fluid therethrough.

Each of the plugs was then cut longitudinally, i.e., substantially axially by means of a diamond saw to form two substantially equal halves. The halves thus made were placed in mating position, separated by a ⅛ inch diameter wire as above described, in the testing chamber of the apparatus of the type shown in FIGURE 4. The space thus provided between the halves was filled with the propping agent in sufficient amount to maintain the 1-inch spacing without added pressure. The wire was removed, and the space further packed with propping agent. The test plug thus assembled and positioned in the testing chamber was then subjected to a pressure against its circumferential surface of 1000 p.s.i.g. and a light-weight fracturing oil at 50 p.s.i.g. was forced into the lower end of the plug. It flowed readily out the upper end of the plug within 15 minutes. The pressure was then released. The oil was allowed to stand in contact with the plug specimen for about 16 hours. At the end of this time the tests shown in the table were run by again employing a pressure of 50 p.s.i.g. on the treating fluid employed and a gradually increased pressure applied against the rubber sleeve to simulate overburden of from 2000 p.s.i.g. up to 8000 p.s.i.g. The effect on the rate of flow of the treating fluid as a result of the increased overburden pressure was recorded.

*Rate of Flow Through Plug in Milliliters Per Second*

| Fracturing Fluids | Kerosene | Water Jel [1] | Oil Jel [2] | Acid Emulsion [3] | Kerosene | Water Jel [1] | Oil Jel [2] | Water Jel | Acid Emulsion [3] | Water Jel [1] |
|---|---|---|---|---|---|---|---|---|---|---|
| Propping Agent | Sand [4] 20–40 mesh. | Sand 20–40 mesh. | Sand 20–40 mesh. | Sand 20–40 mesh. | Sand 10–20 mesh. | Sand 10–20 mesh. | Sand 10–20 mesh. | Sand 8–12 mesh. | None | Al pellets.[5] |
| Overburden pressure in 1,000 psig: [6] | | | | | | | | | | |
| 2,000 | 19.2 | 16.7 | 18.2 | 6.0 | 33.0 | 28.7 | 33.0 | 50.0 | 31.4 | 76.0. |
| 3,000 | 16.7 | 13.9 | 17.0 | 5.3 | 26.9 | 25.0 | 26.4 | 41.5 | 22.8 | 60.0 |
| 4,000 | 13.3 | 11.1 | 12.0 | Ruptured [7] | 10.7 | 15.1 | 16.7 | 20.0 | 12.7 | 44.6. |
| 5,000 | 11.3 | 9.8 | 10.6 | | 6.8 | 12.3 | 12.5 | 13.7 | 12.4 | 38.0. |
| 6,000 | 10.0 | 8.0 | 9.5 | | 5.0 | 9.1 | 9.1 | 10.2 | 6.2 | 33.4. |
| 7,000 | 7.3 | 5.9 | 7.0 | | 3.7 | 7.1 | 6.6 | 7.4 | 4.6 | 29.4. |
| 8,000 | 5.7 | 4.5 | 4.9 | | 2.6 | 5.9 | 4.6 | 5.3 | 3.3 | 10.2. |

[1] Water-jel: 20 pounds of guar gum per 1,000 gallons of water.
[2] Oil-jel: About 15 pounds of tall oil and a substantially stoichiometric quantity of NaOH.
[3] Emulsion of crude oil and water containing about 15 percent by weight HCl and a corrosion inhibitor.
[4] Ottawa Flint Shot Sand.
[5] Aluminum pellets, of avg. size of 10 mesh, employed to the extent that about 8 percent of the fracture void was filled therewith.
[6] Prior to cutting the plug specimens to simulate a fracture, a partially refined fracturing fluid, having a viscosity of between 200 and 300 cps. was tried at a pressure of 50 p.s.i.g. and an overburden of only 1,000 p.s.i.g. The flow was zero.
[7] Rupture was apparently due to excessive weakening of the core due to attack thereon by the acid.

Reference to the table shows that the test of the invention is a valuable guide for predetermining the susceptibility of a formation to improved permeability by creating fractures or fissures therein. It further shows that different fracturing fluids vary in their effectiveness due presumably to their behavior in a formation immediately following the creation of a fracture in the formation. Different propping agents are also shown to vary in their effectiveness for use in fracturing. For example, the formation, as evidenced by the test results, was so low in permeability before the simulated fracture was produced that no flow was observed at 50 p.s.i.g. and an overburden pressure of only 1000 p.s.i.g. However, after fracturing in accordance with the test, the rate of flow of the water fracturing fluid, i.e., the gum thickened water-base fluid containing aluminum pellets was 76 milliliters per second at an overburden pressure of 2000 p.s.i.g. whereas the rate of flow was only 6 millimeters per second when an acid-fracturing liquid containing 20 to 40 mesh sand was employed. Other comparisons may be made to show the preferred treating fluid and core propping agent to employ.

Having described the invention, what I claim and desire to protect by Letters Patent are:

1. A method of ascertaining the susceptibility of a subterranean formation to improvement, by hydraulic fracturing and subsequent treatment of the fractured formation employing a liquid composition, consisting essentially of taking a cylindrical core substantially transverse to the bedding planes of the formation; cutting cylindrical plugs from said core at substantially right angles to the axis of the core and parallel to the bedding planes; cutting the plug axially to divide it into two substantially equal halves having mating substantially flat faces; reassembling the halves by placing the mating flat faces in substantially their original position prior to cutting, inserting a removable spacer between the two thus positioned mating faces to provide a space therebetween and, while said spacer is in position between the two halves of the plug, packing propping agent into the space between the halves thus formed by the spacer, and thereafter removing the spacer, said plug now having a simulated fracture therein; positioning the thus assembled plug in a flexible sleeve of the general shape of the assembled plug, said sleeve being provided with open ends, to permit passage of a fluid along the bedding planes, and with fluid-confining sidewalls, and being positioned in a rigid cylindrical chamber of the same general shape as the sleeve, said chamber being provided with openings at each end for communication with the interior of said sleeve, pressure-type sidewalls, and a circumferential opening in said sidewalls for the admission of a fluid to simulate overburden pressure in the formation; introducing a testing fluid under pressure into one end of said plug so as to enter the plug substantially parallel to the bedding planes thereof and out the other end of the plug while introducing a fluid under pressure into the circumferential opening in the sidewall of said chamber at various pressures to exert force against the circumferential periphery of said flexible sleeve thereby to simulate various overburden pressures on the plug and measuring the rate of flow of said testing fluid from the plug at various overburden pressures.

2. The method according to claim 1 wherein the spacer is a wire having a diameter of about 1/8 inch.

3. The method according to claim 2 wherein the wire is in a U-shaped loop and is inserted with the open end of the U foremost.

4. The method according to claim 1 wherein additional propping agent is packed into the space between the halves of the plug after the wire has been removed and prior to subjecting the plug to simulated overburden pressure.

References Cited in the file of this patent

UNITED STATES PATENTS

| 2,543,716 | Carini | Feb. 27, 1951 |
| 2,705,418 | Reichertz et al. | Apr. 5, 1955 |
| 2,774,431 | Sherborne | Dec. 18, 1956 |

OTHER REFERENCES

Hughes, D. S.: "The Effect of Pressure in the Reduction of Pore Volume of Consolidated Sandstones," Geophysics, April 1953, pages 298–309.